(12) United States Patent
Bruno et al.

(10) Patent No.: US 7,685,145 B2
(45) Date of Patent: Mar. 23, 2010

(54) DATABASE PHYSICAL DESIGN REFINEMENT USING A MERGE-REDUCE APPROACH

(75) Inventors: Nicolas Bruno, Redmond, WA (US); Surajit Chaudhuri, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 309 days.

(21) Appl. No.: 11/391,649

(22) Filed: Mar. 28, 2006

(65) Prior Publication Data

US 2007/0239744 A1    Oct. 11, 2007

(51) Int. Cl.
G06F 7/00 (2006.01)
G06F 17/00 (2006.01)
G06F 12/00 (2006.01)
G06F 17/30 (2006.01)

(52) U.S. Cl. .................... 707/101; 707/2; 707/200
(58) Field of Classification Search .............. 707/2, 707/101, 200
See application file for complete search history.

(56) References Cited

U.S. PATENT DOCUMENTS

| | | | |
|---|---|---|---|
| 5,485,610 A * | 1/1996 | Gioielli et al. | 707/102 |
| 5,544,355 A | 8/1996 | Chaudhuri et al. | |
| 5,546,575 A * | 8/1996 | Potter et al. | 707/101 |
| 5,913,206 A | 6/1999 | Chaudhuri et al. | |
| 5,913,207 A | 6/1999 | Chaudhuri et al. | |
| 5,926,813 A | 7/1999 | Chaudhuri et al. | |
| 5,950,186 A | 9/1999 | Chaudhuri et al. | |
| 5,960,423 A | 9/1999 | Chaudhuri et al. | |
| 6,169,983 B1 | 1/2001 | Chaudhuri et al. | |
| 6,266,658 B1 | 7/2001 | Adya et al. | |
| 6,356,890 B1 * | 3/2002 | Agrawal et al. | 707/2 |
| 6,356,891 B1 | 3/2002 | Agrawal et al. | |
| 6,366,903 B1 | 4/2002 | Agrawal et al. | |
| 6,513,029 B1 | 1/2003 | Agrawal et al. | |
| 6,532,458 B1 | 3/2003 | Chaudhuri et al. | |
| 6,542,886 B1 | 4/2003 | Chaudhuri et al. | |
| 6,591,269 B1 * | 7/2003 | Ponnekanti | 707/100 |
| 7,139,778 B2 | 11/2006 | Chaudhuri et al. | |
| 7,155,459 B2 | 12/2006 | Chaudhuri et al. | |
| 7,249,141 B2 | 7/2007 | Agrawal et al. | |
| 7,281,013 B2 | 10/2007 | Chaudhuri et al. | |

(Continued)

FOREIGN PATENT DOCUMENTS

EP    1482423 A2 * 12/2004

OTHER PUBLICATIONS

Weikum et al, "Foundations of Automated Database Tuning", Mar. 27, 2006.*

(Continued)

*Primary Examiner*—Yicun Wu
*Assistant Examiner*—Brannon W Smith

(57) ABSTRACT

Various embodiments are disclosed relating to database configuration refinement. In an example embodiment, a method is provided that may include determining a size limitation for a database configuration, determining a workload of the database configuration, and making a determination that a size of the database configuration is greater than a size limit. The method may also include applying either a merge process or a reduction process to decrease the size of the database configuration. The merge process may merge a first index/view with a second index/view to produce a merged index/view, for example. The reduction process may delete a first portion of a first view to produce a reduced view.

20 Claims, 8 Drawing Sheets

U.S. PATENT DOCUMENTS

| | | | |
|---|---|---|---|
| 7,383,262 B2 | 6/2008 | Das et al. | |
| 7,472,107 B2 | 12/2008 | Agrawal et al. | |
| 7,483,918 B2 | 1/2009 | Chaudhuri et al. | |
| 7,567,949 B2 | 7/2009 | Chaudhuri et al. | |
| 7,567,962 B2 | 7/2009 | Chakrabarti et al. | |
| 2003/0236794 A1* | 12/2003 | Hostetter et al. | 707/101 |
| 2004/0117387 A1* | 6/2004 | Civetta et al. | 707/100 |
| 2006/0085484 A1* | 4/2006 | Raizman et al. | 707/200 |

OTHER PUBLICATIONS

Kim et al, "View-Size Estimation in Self-Organizing Databases", 2005.*

Agrawal et al, "Automated Selection of Materialized Views and Indexes for SQL Databases", 2000.*

Sattler et al, "QUIET: Continuous Query-driven Index Tuning", 2003.*

Chaudhuri et al, "Rethinking Database System Architecture: Towards a Self-tuning RISC-style Database System", 2000, VLDB Journal.*

"TPC Benchmark H", Standard Specification, (1993-2005) Transaction Processing Performance Council, 115 pages.

Agrawal, et al. "Materialized View and Index Selection Tool for Microsoft SQL Server 2000", 1 page.

Agrawal, et al. "Database Tuning Advisor for Microsoft SQL Server 2005", pp. 1110-1121.

Bruno, et al. "Automatic Physical Database Tuning: A Relaxation-based Approach", pp. 227-238.

Chaudhuri, et al. "Index Merging", Microsoft Research, Redmond, WA. 8 pages.

Chaudhuri, et al. "An Efficient, Cost-Driven Index Selection Tool for Microsoft SQL Server", Redmond, WA. pp. 1-10.

Dageville, et al. "Automatic SQL Tuning in Oracle 10g", Redwood Shores, CA. pp. 1098-1109.

Goldstein, et al. "Optimizing Queries Using Materialized Views: A Practical, Scalable Solution", Redmond, WA. pp. 331-342.

Valentin, et al. "DB2 Advisor: An Optimizer Smart Enough to Recommend Its Own Indexes", IEEE (2000), pp. 101-110.

Zilio, et al. "DB2 Design Advisor: Integrated Automatic Physical Database Design", Proceedings of the 30th VLDB Conference (2004), Toronto, Canada, pp. 1087-1097.

Agrawal, et al. "Materialized View and Index Selection Tool for Microsoft SQL Server 2000", 1 page, (2001).

Agrawal, et al. "Database Tuning Advisor for Microsoft SQL Server 2005", pp. 1110-1121, (2004).

Bruno, et al. "Automatic Physical Database Tuning: A Relaxation-based Approach", pp. 227-238, (2005).

Chaudhuri, et al. "Index Merging", Microsoft Research, Redmond, WA. 8 pages, (1999).

Chaudhuri, et al. "An Efficient, Cost-Driven Index Selection Tool for Microsoft SQL Server", Redmond, WA. pp. 1-10, (1997).

Dageville, et al. "Automatic SQL Tuning in Oracle 10g", Redwood Shores, CA. pp. 1098-1109, (2004).

Goldstein, et al. "Optimizing Queries Using Materialized Views: A Practical, Scalable Solution", Redmond, WA. pp. 331-342, (2001).

Agrawal et al., "Automatic Physical Design Tuning: Workload as a Sequence", in Proceedings of the ACM International Conference on Management of Data (SIGMOD) (2006).

Bruno et al., "Physical design refinement: The "Merge-Reduce" Approach", in Proceedings of the International Conference on Extending Database Technology (EDBT) (2006), ACM Transactions on Database Systems (TODS) (2007).

Bruno et al., "To tune or not to Tune? A Lightweight Physical Design Alerter", in Proceedings of the International Conference on Very Large Databases (VLDB'06) (2006).

Bruno et al., "An Online Approach to Physical Design Tuning", in Proceedings of the International Conference on Data Engineering (ICDE) (2007).

Chaitin et al., "Register Allocation Via Coloring", in Computer Languages, vol. 6, pp. 47-57 (1981).

Chaudhuri et al., "Compressing SQL Workloads" in Proceedings of the ACM International Conference on Management of Data (SIGMOD) (2002).

Finkelstein, S., "Common Expression Analysis in Database Applications", in Proceedings of the ACM International Conference on Management of Data (SIGMOD) (1982).

Graefe, G., "The Cascades Framework for Query Optimization", Data Eng. Bull. 18, 3 (1995).

Konig et al., "Scalable Exploration of Physical Database Design", in Proceedings of the International Conference on Data Engineering (ICDE) (2006).

Mistry et al., "Materialized View Selection and Maintenance Using Multi-Query Optimization", in Proceedings of the ACM International Conference on Management of Data (SIGMOD) (2001).

Park et al., "Using Common Subexpressions to Optimize Multiple Queries", in Proceedings of the International Conference on Data Engineering (ICDE) (1988).

Ross et al., "Materialized View Maintenance and Integrity Constraint Checking: Trading Space for Time", in Proceedings of the ACM International Conference on Management of Data (SIGMOD) (1996).

Roy et al., "Efficient and Extensible Algorithms for Multi Query Optimization", in Proceedings of the ACM International Conference on Management of Data (SIGMOD) (2000).

Selinger et al., "Access Path Selection in a Relational Database Management System", in Proceedings of the ACM International Conference on Management of Data (1979).

Sellis, T. K., "Multiple-Query Optimization", ACM Trans. Database Syst. 13, 1, 23-52 (1988).

Zilio et al., "Recommending Materialized Views and Indexes with IBM DB2 Design Advisor", in International Conference on Autonomic Computing (2004).

* cited by examiner

```
GreedyPDR (C:configuration, B:storage bound)
01  CF = C
02  while (size(CF) > B)    // or any other ending condition
03    select transformation T with smallest benefit (=largest penalty)
           // T is valid merge or reduction, or deletion of an index
04    CF = CF - "T's antecedents" ∪ "T's consequent"
           // Merge: antecedent are input views, consequent is merged view
           // Reduction: antecedent is input view, consequent is reduced view
           // Deletion: antecedent is view, consequent is empty
05  return CF
```

FIG. 8

DATABASE PHYSICAL DESIGN REFINEMENT USING A MERGE-REDUCE APPROACH

BACKGROUND

Databases are very useful tools, and may allow users to organize and selectively retrieve data based on queries, etc. However, as new queries are entered and new sets of indexes and views are generated, a database configuration may typically increase in size over time. A database administrator (DBA) may typically adjust or tune the database configuration to decrease its size. This can be a significant challenge, and often involves using a combination of automated tools and manual adjustment. Current techniques directed to this problem are typically inadequate.

SUMMARY

Various embodiments are disclosed relating to databases, and also relating to physical design refinement for a database configuration. According to an example embodiment, an apparatus may be provided that includes a processing device. The processing device may be adapted to obtain a first database configuration, and to make a determination that the size of the first database configuration is greater than a size limit. The processing device may also be adapted to select one of a plurality of database configuration transformations (such as a delete process, a merge process and/or a reduction process), and then to apply the transformation to the first database configuration to produce a second database configuration having a size that is smaller than the first database configuration. In an example embodiment, a database configuration transformation may be selected and applied that has a relatively low (or possibly a lowest) efficiency penalty, as compared to other transformations.

In another example embodiment, a method is provided that includes determining a size limitation for a database configuration, determining a workload of the database configuration, and making a determination that a size of the database configuration is greater than a size limit. The method also may also include applying either a merge process or a reduction process to decrease the size of the database configuration. The merge process may merge a first index/view with a second index view to produce a merged view, for example. The reduction process may delete a first portion of a view to produce a reduced view, where the first (deleted) portion may be recreatable or reproducible from the reduced view.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

FIG. 8 provides pseudocode for a progressive variation of the fractional knapsack technique according to an example embodiment.

DETAILED DESCRIPTION

1.0 Introduction and PDR Overview

Figure 1:
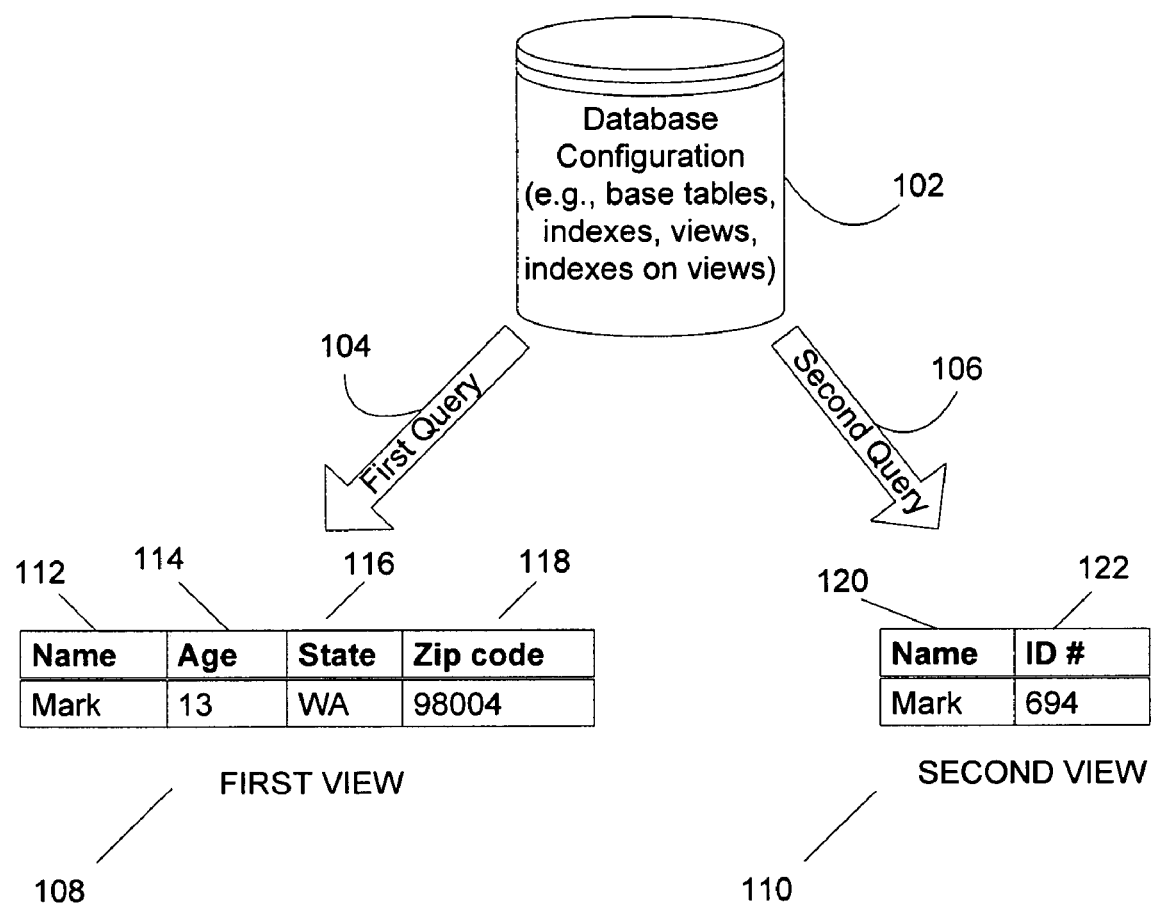
FIG. 1 is a diagram illustrating a database configuration according to an example embodiment.

Referring to the Figures in which like numerals indicate like elements, FIG. 1 is a diagram illustrating a database configuration according to an example embodiment. A database configuration 102 may, for example, include one or more base tables, where each table may be organized into one or more rows (or tuples) and columns (or attributes). A database configuration may, for example, include one or more base tables, one or more indexes, and/or one or more views, and/or one or more indexes over views. An index may be a group of one or more columns of a base table. The index may be for one column, or for multiple columns. Also, an index may typically include data for the selected column(s) from all rows (tuples) of the base table. A view may be a resulting set of data from a query. Thus, a view may be considered a redundant data structure that provides a subset of data from the base table (another table) or multiple base tables joined together, resulting from a query. An index may be obtained over a view, since a view may be considered to be another table (e.g., with rows and columns). Thus, an index over a view may be considered to be one or more selected columns of the view. A base table may be considered a most general view from a base table since it includes all columns and rows from the base table (e.g., resulting from a query that selects all data from the base table). Thus, a database configuration (e.g., including base tables, indexes, views, indexes over views) may generally be described as a set of indexes and views.

A workload for a database may be the queries which are processed or handled, and the workload may be represented by a common set of queries, for example. In an example embodiment, a workload for a database configuration may be defined based on (or as) a set of queries (e.g., a set of common queries).

As shown in FIG. 1, a first query may be processed on a base table of database configuration 102 to produce a first view 108. First view 108 may include, for example, one or more rows (or tuples) for several columns (or attributes). In this example shown in FIG. 1, first view 108 may include one row for the name column 112, the age column 114, state column 116 and zip code column 118. The data for this row includes: Mark (name), 13 (age), WA (state) and 98004 (zip code). Similarly, a second query may be run against one or more base tables of database configuration 102, resulting in a second view 110. Second view 110 may include data elements for one row, including Mark (name column 120) and 694 (ID# column 122). Although the first and second views only include one row each, these views may include any number of rows and columns (based on the results from their respective queries).

For database configurations, there may be design tradeoffs between storage space and processing efficiency. There is typically a storage size limitation for a database configuration. For example, at least in some cases, a query may be processed more efficiently on an index (one or more selected columns) since the index may typically be smaller than the base table. However, the index, which duplicates one or more columns from a base table, requires storage space. Also, any changes to the base table will need to be propagated to the one or more indexes. Thus, indexes may include some processing overhead, such as updating data in indexes as data in the base table is updated.

Similarly, a view may also be considered redundant information, providing the resulting data (table subset) from a query. For example, a view may be stored for a common query so that when the query is repeated, the view can simply be retrieved and output without reprocessing the query, thereby increasing processing efficiency for the work or workload. Each view also requires storage space. Therefore, both indexes and views typically provide increased processing efficiency for the database workload, but at the cost of increased storage space. As new queries are run, or new data is input, etc., the database configuration may typically grow to a size that may exceed a size limitation for the database configuration.

Therefore, according to an example embodiment, a database may be refined or tuned through one or more transformations to reduce a size of the database configuration (e.g., by decreasing redundancy in the database configuration), while avoiding a significant loss of processing efficiency. At least some transformations or adjustments to the database configuration may decrease the size of the database and may be associated with an efficiency penalty (e.g., a decrease in processing efficiency). The problem or issue of refining a database configuration (e.g., by reducing redundancy) without substantially compromising processing efficiency may be referred to as the Physical Design Refinement (PDR) problem. A refinement session may be one or more (or a series) of transformations, which may locally change the database configuration by trading space and efficiency. Refinement generally may refer to the process of going from a first database configuration to a second database configuration (e.g., by adjusting or tuning the database configuration by one or more transformations). These transformations may include a merge operation, a reduce (or reduction) operation, and others, for example.

According to an example embodiment, as part of the tuning or refinement of the database configuration, the one or more transformations may be applied to any aspect of the database configuration (indexes, views, etc.). As noted, a database configuration may be generally considered to be a set of indexes and views. The term index/view may be referred to herein to include indexes and/or views (e.g., one or more of indexes, views, indexes over views).

Figure 2:
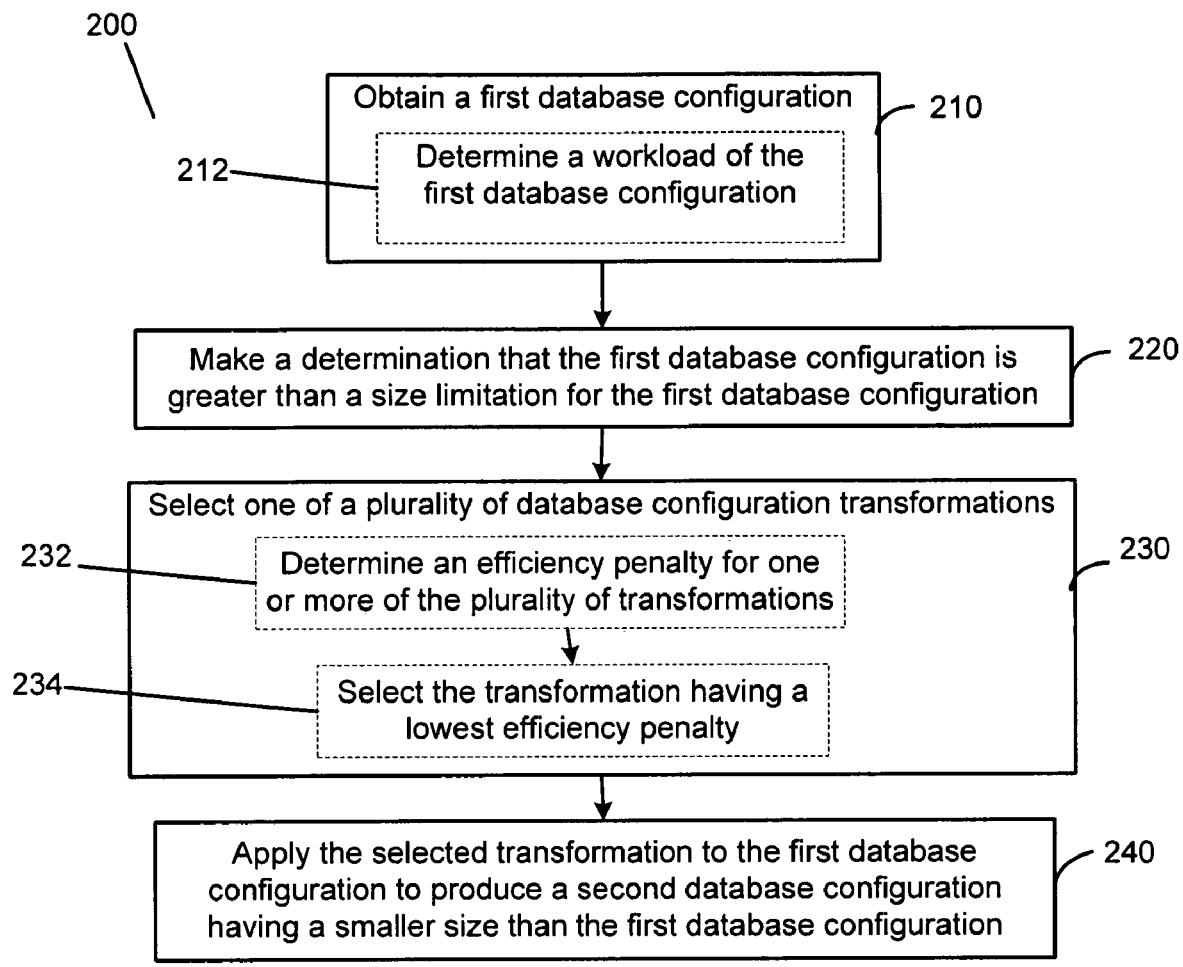
FIG. 2 is a flow chart illustrating a refinement process for a database configuration according to an example embodiment.

FIG. 2 is a flow chart illustrating a refining or adjustment of a database configuration (or a refinement process 200) according to an example embodiment. At 210, a first database configuration is obtained. This may be an initial database configuration, or it may be the current database configuration (e.g., current set of indexes and views). As part of this, a workload may be determined at 212, according to an example embodiment. A workload may be, for example a set of queries, such as a common set of queries. According to an example embodiment, a workload may be determined by tracking the execution of queries, and then assigning a weight to each query or each view or each index, based on the tracking of queries. (e.g., queries which are more frequently processed may result in greater weights for the associated queries.).

At 220, a determination may be made that the first database configuration is greater than a size limitation for the database. This may be performed, for example, by comparing a size of the database configuration to a size limitation.

At 230, one of a plurality of database configuration transformations is selected. The database configuration transformations may include, for example, a deletion process (or transformation), a merge process and a reduction process, although others may be used as well. A deletion process may, for example, involve deleting a portion of the database configuration (e.g., deleting a view or index if no longer used or not used very often). A merge process (merge transformation) may, for example, involve merging two or more views or two or more indexes (or more generally merging two or more index/views) to create a merged view (e.g., where a redundancy between the two index/views may be decreased or eliminated). The reduction process may involve deleting a portion of a view to create a reduced view, where, for example, the deleted portion may be recreated based on the reduced view. The merge and reduction processes are described in more detail below.

In an example embodiment, selecting (230) one of a plurality of database configuration transformations in refinement process 200 may include: determining an efficiency penalty for one or more of the transformations (232); and selecting a transformation having a lower or lowest efficiency penalty. An efficiency penalty may be determined, for example, by estimating an amount of time to process a query both before and after the transformation. For example, deleting a view, or merging two views, or reducing a view may save storage space at the expense of requiring additional time to process the query. For example, a compensating action may be required to recreate the deleted information to process a query after applying a reduction process to an index/view. The efficiency penalty for such reduction process may be determined or quantified based on the additional time required to perform this compensating action to recreate the deleted information, for example. This is merely an example, and a wide variety of techniques may be used to determine or quantify and compare the various efficiency penalties for each transformation. Alternatively, at 234, in a simple example embodiment, a transformation may be selected, that offers the greatest decrease in size as compared to any decrease in efficiency (e.g., highest ratio of Δ size/Δ efficiency).

At 240, the selected transformation (or process) is applied to the first database configuration to produce a second database configuration that has a smaller size than the first database configuration. The refinement process 200 in FIG. 2 (e.g., blocks 220, 230 and 240) may be repeated or performed iteratively until at 220, it is determined that the database configuration is not greater than a size limitation. The refinement process 200 of FIG. 2, may be performed iteratively and may use a variety of different combinations of transformations. For example, on a first pass through the refinement process first and second views may be merged (using a merge process) to create a merged view, and on a second pass through process 200, the merged view is then reduced using a reduction process. Likewise, first and second views may each first be reduced, and then these two reduced views may be merged.

2.0 Merge Operations

Figure 3:
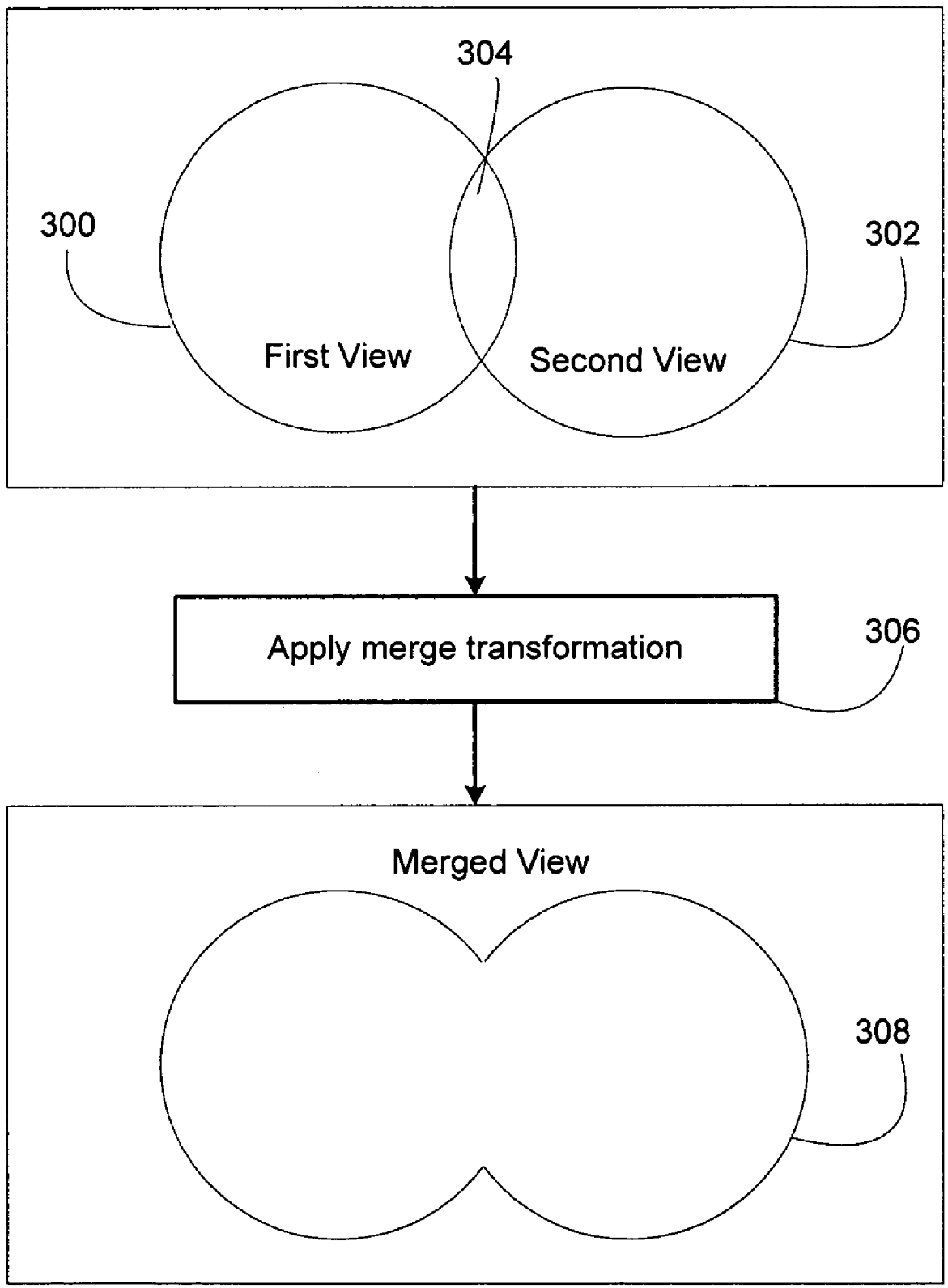
FIG. 3 is a block diagram illustrating a merge process (or merge transformation) according to an example embodiment.

FIG. 3 is a block diagram illustrating a merge process (or merge transformation) according to an example embodiment. A first view 300 and a second view 302 are provided. A redundancy portion 304 is shown, and is provided in each of the first view 300 and second view 302 (one copy of this portion 304 is included in each view). The merge operation may merge (306) the two views 304, and eliminate or at least decrease the redundancy portion 304 between the two views to produce a merged view 308. In an example embodiment, a merge process (or merge transformation) may be substantially the same as or similar to (or analogous to) a union operation between two sets, creating a merged view, e.g., having little or no redundant information. For example, merged view 308 may include only 1 copy of the information 304, having deleted the redundant or second copy of information 304 during the merge process. The merge process may be applied to indexes, views, etc. (index/views).

Thus, according to an example embodiment, in a merge process, redundant information between two index/views may be deleted (this information may typically only appear once in the merged view). In this manner, the database configuration may be decreased in size, but at the possible expense of loss of processing efficiency or an efficiency penalty (e.g., additional processing now being required to process certain queries or the workload). For example, a compensating action may now be required to regenerate the first view 300 from the merged view 308. For example, in general, information associated only with the second view 302 may be deleted from the merged view to regenerate the first view 300.

For example, with reference to FIG. 1, the first view 108 may be merged with the second view 110 to produce a merged view that would include: Mark (name), 13 (age), WA (state), 98004 (zip code) and 694 (ID#) (e.g., assuming that name is a primary key in the underlying table). Note that the second copy of the name Mark (the redundant information in this example) may be deleted during the merge process to create the merged view. In this example, the first view 108 may be regenerated from the merged view by, for example, deleting the ID# (694), as this information is associated only with the second view 110.

Figure 4:
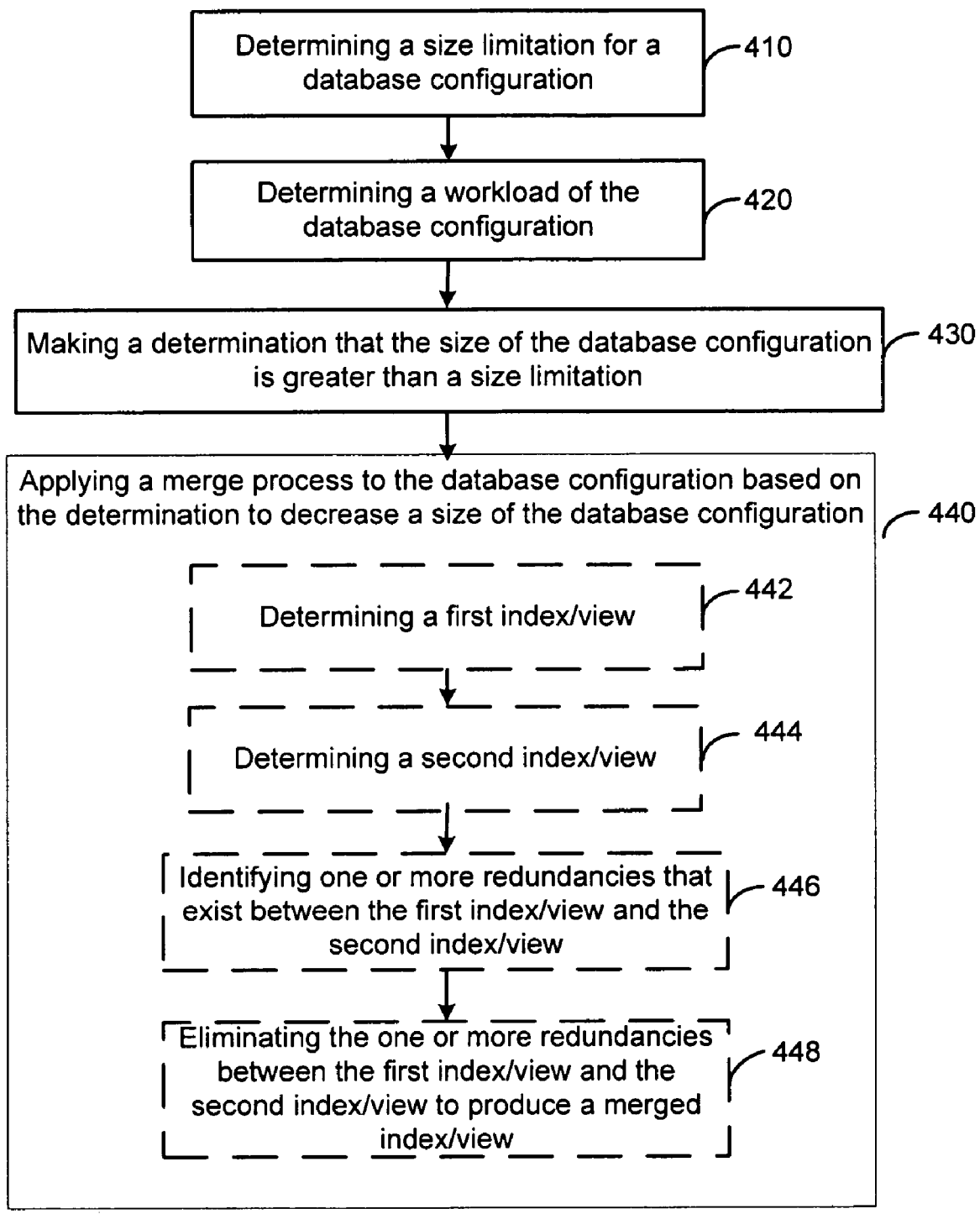
FIG. 4 is a flow chart illustrating a refinement of a database configuration using a merge process according to an example embodiment.

FIG. 4 is a flow chart illustrating a refinement of a database configuration using a merge process according to an example embodiment. At 410, a size limitation is determined for the database configuration. At 420, a workload is determined, e.g., by identifying a common or representative set of queries for the database configuration. This may be done by tracking or reviewing the previously processed queries to identify, e.g., the most common queries. Alternatively, if no track record of queries are yet available, the workload may be inferred. For example, if a set of index/views are available, then a set of queries may be inferred, e.g., by identifying a set of queries that may use or exploit the index/views.

At 430, a determination may be made that the database configuration is greater than a size limitation for the database.

At 440, a merge process is applied to the database configuration (e.g., by merging two or more index/views) based on the determination to decrease a size of the database configuration (e.g., if the configuration is too big or exceeds the size limitation). The merge process (440) may include, for example: determining a first index/view (442); determining a second index/view (444); identifying one or more redundancies that exist between the first index/view and the second index/view (446); and eliminating (448) the one or more redundancies between the first index/view and the second index/view to produce a merged index/view (e.g., which would have only one copy of the redundant information between the two views).

Figure 7:
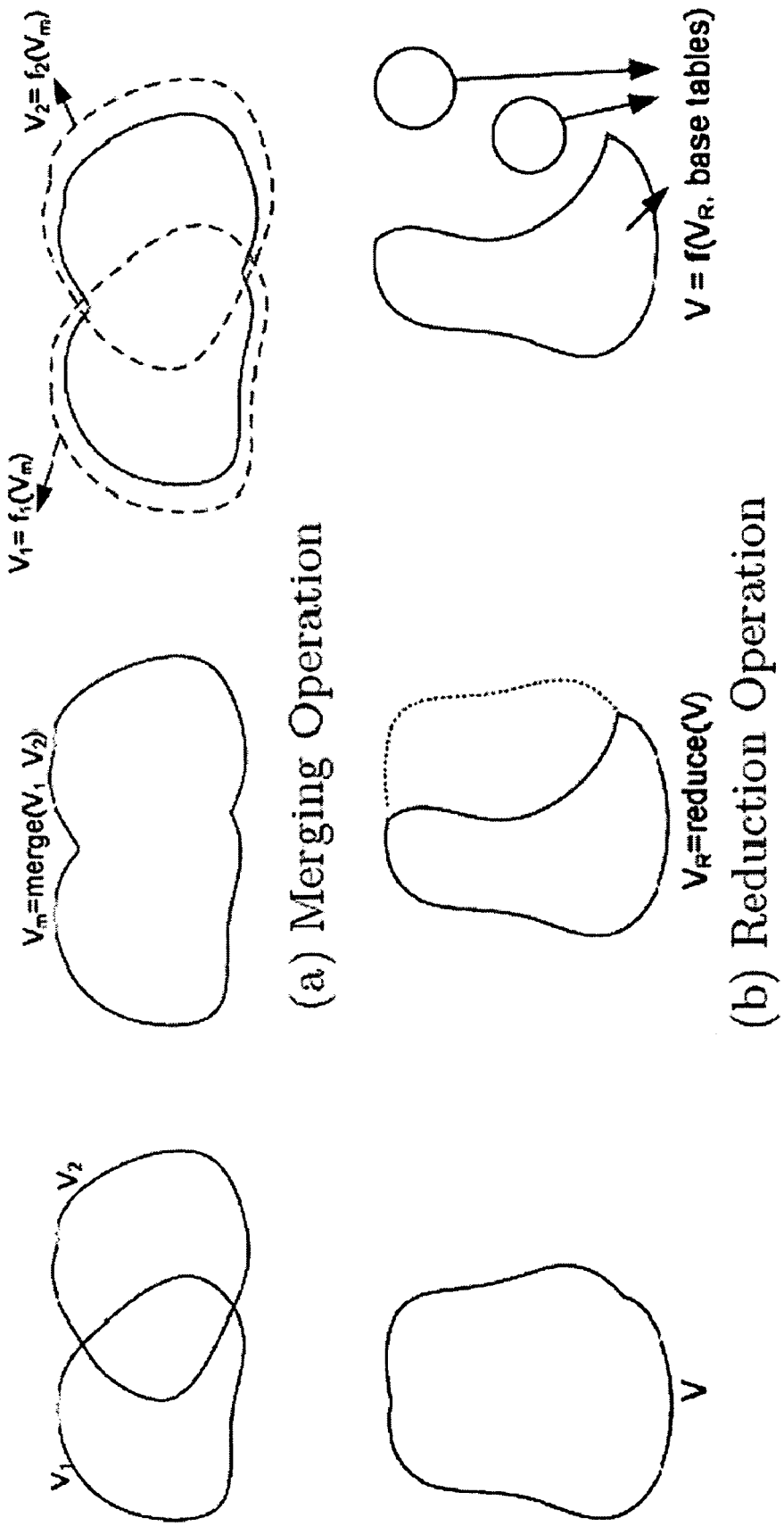
FIG. 7 is a diagram illustrating both a merging operation and a reduction operation.

FIG. 7 is a diagram illustrating both a merging (or merge) operation (part a of FIG. 7) and a reduction operation (part b of FIG. 7). The example merging operation, as shown in FIG. 7, will now be described.

Referring to FIG. 7, merging two materialized views (two views) $V_1$ and $V_2$ results in a new view $V_M$ that reduces the amount of redundancy between $V_1$ and $V_2$. The resulting view $V_M$ is usually smaller than the combined sizes of $V_1$ and $V_2$ at the expense of longer execution times for queries that exploit $V_M$ instead of the original $V_1$ or $V_2$. Both $V_1$ and $V_2$ may be considered as a subset of the resulting $V_M$. In an example embodiment, $V_M$ may be the smallest view that can be used to generate both $V_1$ and $V_2$. The queries that are answered using $V_1$ or $V_2$ are less efficiently answered by $V_M$. The reason is that $V_M$ is a generalization of both $V_1$ and $V_2$ and contains additional, non relevant tuples or rows with respect to the original views. In other words, by merging $V_1$ and $V_2$ into $V_M$ we are effectively trading space for efficiency.

2.1 A Formal Model

To formalize the view merging problem, three query languages may be considered. Let $L_1$ be the language that defines input views, $L_M$ be the language that defines merged views, and $L_C$ be the language that defines compensating actions to re-create the original views in terms of merged view.

Definition 1: Given $V_1$ and $V_2$ from $L_1$, we denote $V_M = V_1 \oplus V_2$ the merging of $V_1$ and $V_2$ when the following properties hold, in an example embodiment. (Note, the symbol $\oplus$ is used to denote the merge operator.)

$V_M$ belongs to $L_M$.

$C_1(V_M) \equiv V_1$ and $C_2(V_M) \equiv V_2$ for some $C_1(V_M)$ and $C_2(V_M)$ in $L_C$.

If the view matching algorithm matches $V_1$ or $V_2$ for a sub-query q, it also matches $V_M$ for q (e.g., a view matching algorithm matches a view V for a sub-query q if q can be answered from V). $V_M$ cannot be further restricted with additional predicates and continue to satisfy the previous properties, according to an example embodiment.

View merging and view matching may be related problems. The idea of view merging is, according to an example embodiment, to obtain, for a given pair of views, some sort of minimal view that may be matched for a sub query whenever the original pair of views match. Although both problems are different, some of the technical details that are introduced below are related to those in view matching literature.

As an example, suppose that both $L_1$ and $L_M$ are the subset of SQL that only allows simple conjunctions over single tables, and $L_C$ is the full SQL (structured query language). Consider the following views: (where a, b, c are indexes—such as age, weight, height, name, etc., within views)

$V_1$=select a,b from R where 10<d<20 (meaning that view $V_1$ is the rows or tuples a and b of a table (or relation) R where the index or element d in such relation R satisfies the indicated range).

$V_2$=select b,c from R where 30<d<40

In this situation, $V_1 \oplus V_2$=select a,b,c from R where 10<d<40. The merged $V_1 \oplus V_2$ is not necessarily smaller than the combined sizes of the input views, as this depends on the number of tuples (or rows) that satisfy $20 \leq d \leq 30$ (and therefore would be additionally included in $V_1 \oplus V_2$). In contrast, suppose we relax $L_M$ to also include disjunctions. In this case, $V_1 \oplus V_2$=select a, b, c, from R where 10<d<20 or 30<d<40. Now, $V_1 \oplus V_2$ contains no additional rows and references only one instance of column b. In general, merged views can be larger than the combined inputs even when there is redundancy, as this depends on the expressive power of $L_M$.

2.2 The $L_{MV}$ Language

In this section, the specific query languages are described, and additional details are provided for the view merging operation. Specifically, if $L_1$ and $L_M$ are the subset of SQL that can be used in a database system for materialized view (view)

matching, and this language may be denoted as $L_{MV}$. A view may be given or described by the following expression:

| | |
|---|---|
| Select $S_1, S_1, \ldots$ | project columns |
| From $T_1, T_1, \ldots$ | tables in the database |
| Where: | |
| $J_1$ and $J_2$ and ... | equi-join predicates |
| $R_1$ and $R_2$ and ... | range predicates |
| $Z_1$ and $Z_2$ and ... | residual predicates |
| Group by $G_1, G_2, \ldots$ | grouping columns |

Where:

$S_i$ are either base-table columns, column expressions or aggregates. If the group by clause is present, then every $S_i$ that is not an aggregate must be either equal to one of the $G_j$ columns or be an expression in terms of them.

$R_i$ are range predicates. The general form of a range predicate is a disjunction of open or closed intervals over the same column (point selections are special cases of intervals). An example of a range predicate is (1<a<10 or 20<a<30).

$Z_i$ are residual predicates, that is, the set of predicates in the query definition that cannot be classified as either join or range predicates.

In other words, we can express in $L_{MV}$ the class of SPJ queries. SPJ is a shorthand for SELECT-PROJECT-JOIN, and it is a subset of the SQL language. SPJ queries with aggregation add group-by clauses to SPJ queries] with aggregation. The reason predicates are split into three disjoint groups (join, range, and residual) is pragmatic. During query optimization, it is easier to perform subsumption tests for view matching if both the view and the candidate sub-query is written in this structured way. A subsumption test checks whether a view is 'more general' than another one. It is similar to an inclusion test, but not completely the same. Specifically, we can then perform simple subsumption tests component by component and fail whenever any of the simple tests fails. For instance, we check that the join predicates in the query are a superset of the join predicates in the view, and the range predicates (column by column) in the query are subsumed by the corresponding ones in the view. Some subsumption tests are more complex than others, notably when group-by clauses are present. We note that this procedure focuses on simplicity and efficiency and therefore can miss some valid matchings due to complex logical rewritings that are not considered by the optimizer. Specifically, consider the case of residual predicates. The problem of determining whether two arbitrary predicates are equivalent can be arbitrarily complex. For that reason, the matching procedure that we consider just checks that every conjunct in the residual predicate of the view appears (syntactically) in the candidate query.

In an example embodiment, a predicate is a test over a tuple, for instance "age<30". A residual predicate is defined above in 45. they are predicates that cannot be classified as range predicates, such as age<30, or equi-join predicates, such as R.a=S.b. A predicate like a*a+b<c is an example of a residual predicate.

Otherwise, although the view can still subsume the query, no match is produced. We simplify the notation of a view in $L_{MV}$ as (S, T, J, R, Z, G), where S is the set of columns in the select clause, T is the set of tables, J, R, and Z are the sets of join, range, and residual predicates respectively, and G is the set of grouping columns. In this example embodiment, the merging operation may be restricted so that the input views agree on the set of tables T, for example. (The sets join, range and residual predicates are the {J1, J2, ... }, {R1, R2, ... }, {Z1, Z2, ... }, respectively, as defined above.) The is twofold.

On the one hand, many top-down query optimizers restrict the view matching operation to queries and views that agree on the input tables (presumably, if a candidate view contains fewer tables than the input query q, it should have matched a sub-query of q earlier during optimization). (For example, a query optimizer may be a component in a database system that compiles a SQL query into an efficient execution plan that is later evaluated). On the other hand, merging views with different input tables can be done by combining the reduce (or reduction) operator of and the merging operation. We next define the merging operator in $L_{MV}$.

Case 1: No Grouping Columns

Consider merging $V_1 = (S_1, T, J_1, R_1, Z_1)$ and $V_2 = (S_2, T, J_2, R_2, Z_2)$. If the merging language were expressive enough, we could define $V_1 \oplus V_2$ as:

Select $S_1 \cup S_2$

From T

Where $(J_1$ and $R_1$ and $Z_1)$ or $(J_2$ and $R_2$ and $Z_2)$, which satisfies properties 2 and 4 in Definition 1. To satisfy property 1 (rewriting $V_1 \oplus V_2$ in $L_{MV}$), we may consider the whole predicate in the where clause as a single conjunctive residual predicate Z. The problem is that now the merged view would not be matched whenever $V_1$ or $V_2$ are matched (property 3) because of the simple procedures used during view matching in general and with respect to residual predicates in particular. The smallest view $V_M$ may be obtained that is in $L_{MV}$ and satisfies property 3, for example. For that purpose, the above minimal predicate may be rewritten as follows:

$$(J_1 \wedge R_1 \wedge Z_1) \vee (J_2 \wedge R_2 \wedge Z_2) \equiv (J_1 \vee J_2) \wedge (R_1 \wedge R_2) \wedge (Z_1 \vee Z_2) \wedge C$$

Where C is the conjunction of all crossed disjuncts $((J_1 \vee R_2) \wedge (R_1 \vee Z_2) \wedge \ldots)$.

According to an example embodiment, the symbols are the logical version of AND ($\wedge$) and OR ($\vee$). So, for example, a<10∧b<20 is the same as a<10 AND b<20. A Conjunction is a predicate that is connected with AND operators, such as a<10 AND b<20. A disjunction is a predicate connected with OR operators, such as a<10 OR b<20. A conjunct is each of the components of a conjunction, and a disjunct is each of the components of a disjunction, in an example embodiment.

In an example embodiment, this expression may be relaxed until a predicate is obtained that can be written in $L_{MV}$ and matches any candidate query that is matched by the original views. The expression may be relaxed by first removing the conjunct C, which leaves three conjuncts $(J_1 \vee J_2, R_1 \vee R_2,$ and $Z_1 \vee Z_2)$ which may be mapped into the three groups of predicates in $L_{MV}$. First consider $J_1 \vee J_2$ and recall that each $J_i$ is a conjunct of equi-join predicates. According to an example embodiment, an equijoin predicate is of the form col1=col2. For instance, R.a=S.b is an equi-join predicate. These are the J1, J2, noted above. In an example embodiment, $J_1 \vee J_2$ may not be used, for example, in the resulting view because the language specifies that this should be a conjunction of simple equi-joins (i.e., no disjunctions allowed).

We may rewrite: $J_1 \vee J_2 \equiv (J^1_1 \wedge J^2_1 \wedge J^3_1 \wedge \ldots) \vee (J^1_2 \wedge J^2_2 \wedge J^3_2 \wedge \ldots)$ $\equiv \bigwedge_{i,j} (J^i_1 \vee J^j_2)$ And relax this predicate as follows: we keep (i,j) conjunct for which $J^i_1 \equiv J^j_2$ and discard (relax) the remaining ones. We obtain then $\bigwedge J^k \in J_1 \cap J_2^k$, as the set of join predicates in the merged view. Note that this predicate can be much more general than the original $J_1 \vee J_2$, but the view matching procedure would typically match $V_M$ with respect to the join subsumption test in this case. The same idea may be used for $Z_1 \vee Z_2$ and therefore the residual predicate for $V_M$ is $$\wedge z^k \epsilon Z_1 \cap Z_2 z^k.$$

It turns out that the range predicates $R_1 \vee R_2$ can be improved due to their specific structure. Using the same argument, we first rewrite $R_1 \vee R_2$ as $\wedge_{i,j}(R^i_1 \vee R^j_2)$ where each $R^i_1$ and $R^j_2$ are disjunctions of open or closed intervals over some column. As before, if $R^i_1$ and $R^j_2$ are defined over different columns, we may typically discard that conjunct. However, if they are defined over the same column, we may typically keep the predicate, for example, even when $R^i_1$ and $R^j_2$ are not the same, by taking the union of the corresponding intervals (we denote this operation with the symbol $\wedge$). To avoid missing some predicates, we first add conjuncts $-\infty<x<\infty$ to one of the range predicates if column x is only present in the other range predicate (it does not change the semantics of the input predicates but restricts further the result). Also, if after taking the union the predicate over some column x becomes $-\infty<x<\infty$, we discard this conjunct from the result. The following is an example:

$$R_1 = (10<a<20 \vee 30<a<40) \wedge (20<b<30) \wedge (c<40)$$

$$R_2 = (15<a<35) \wedge (10<b<25) \wedge (c>30) \wedge (10<d<20)$$

$$R_1 \wedge R_2 = (10<a<40) \wedge (10<b<30) \wedge (10<d<20)$$

After obtaining join, range, and residual predicates as described above, the set of columns may be assembled in the merged view. In an example embodiment, at a minimum, this set may typically contain, for example, the union of columns present in both input views. However, in some cases, this is not enough in general, as illustrated next. Consider for instance:

$V_1$=SELECT a FROM R WHERE 10<c<20

$V_2$=SELECT b FROM R WHERE 15<c<30

The candidate merged view V=SELECT a, b FROM R WHERE 10<c<30 does not satisfy property 2 in Definition 1 because $V_1$ and $V_2$ cannot be obtained from V, in this example. The reason is that we need to apply additional predicates to V(c<20 to obtain $V_1$ and 15<c to obtain $V_2$), but V does not expose column c. For that reason, we may add to the set of columns in the merged view all the columns that are used in join, range, and residual predicates that are eliminated in the merged view. Similarly, if some range predicate changed from the input to the merged view, we may need, for example, to add the range column as an output column, or otherwise we may not be able to reconstruct the original views, according to an example embodiment.

To summarize, the merging of two views as described in this section, according to an example embodiment, may be described as follows (this is merely one example, and others may be used):

| | | |
|---|---|---|
| $V_1 = (S_1,$ | $T, J_1,$ | $R_1, Z_1, \emptyset)$ |
| $V_2 = (S_2,$ | $T, J_2,$ | $R_2, Z_2, \emptyset)$ |
| $V_1 \oplus V_2 = (S_1 \cup S_2 \cup$ required columns, $T, J_1 \cap J_2, R_1 \cup R_2, Z_1 \cap Z_2, \emptyset$ | | |

In an example embodiment, the symbol $\cap$ is the intersection operator between sets. For instance $\{a,b,c\} \cap \{a,d,e\}=\{a\}$, because a is the element that appears in both sets].

In an example embodiment, all the transformations mentioned above take into account column equivalence. If both input views contain a join predicate R.x=S.y, then the range predicates R.x<10 and S.y<10 are considered to be the same, for example. The following example illustrates some of the ideas described in this section: (the notation R.a refers to a column a within table R; same for table S):

| $V_1 =$ | $V_2 =$ | $V_1 \oplus V_2 =$ |
|---|---|---|
| From R, S where | Select y, z | Select x, y, z, a, b, d |
| R.x = S.y | From R, S where | From R, S where |
| And 10 < R.b | R.x = S.y | R.x = S.y |
| And R.x + S.d < 8 | And 15 < R.a < 50 | And 10 < R.a < 50 |
| | And R.b > 5 and R.c > 5 | And R.c > 5 |
| | And S.y + S.d < 8 and | And R.x + S.d < 8 |
| | R.d*R.d = 2 | |

Case 2: Grouping Columns

The case will now be described of merging views that involve group-by clauses. According to an example embodiment, grouping operators partition the input relation into disjoint subsets and return a representative tuple (or row) and some aggregates from each group.

Conceptually, there may be a group-by operator as a post-processing step after the evaluation of the SPJ sub-query. Consider the merged view obtained when the grouping columns are eliminated from the input views. If the group-by columns in the input views are different, each view partitions the input relation in different ways.

In such case, it may be useful to partition the merged view in the coarsest way that still allows us to recreate each input view. For that purpose, the set of group-by columns in the merged view may typically be the union of the group-by columns of the input views. Additionally, each column that is added to the select clause due to predicate relaxation in the input views may typically also be added as a grouping column.

Note that it may be desirable to handle a special case properly. If one of the input views contains no group-by clause, the merged view should typically not contain any group-by clause either, or else we would compromise correctness (i.e., we implicitly define the union of a set of columns and the empty set as the empty set). In these situations, we additionally unfold all original aggregates into base-table columns so that the original aggregates can be computed from the resulting merged view.

To summarize, we define $(S_1, T, J_1, R_1, Z_1, G_1) \oplus (S_2, T, J_2, R_2, Z_2, G_2)$ as $(S_M, T, J_1 \cap J_2, R_1 \wedge R_2, Z_1 \cap Z_2, G)$, where:

$S_M$ is the set of columns obtained in the no group-by case, plus the group-by columns if they are not the same as the input views. If the resulting $G_M = \emptyset$, all aggregates are typically unfolded into base-table columns. Case 1, is the no group-by case. Case 2 is the group-by case.

$G_M = G_1 \cup G_2 \cup$ columns added to $S_M$ (note that $G \cup \emptyset = \emptyset$).

Example 2: The following example illustrates some of the ideas in this section:

| $V_1 =$ | $V_2 =$ | $V_3 =$ |
|---|---|---|
| Select R.x, sum (S, y) | Select R.x, R.z | Select S.y, sum (S, z) |
| From R, S where | From R, S where | From R, S where |
| R.x = S.y | R.x = S.y | R.x = S.z |

-continued

| And 10 < R.a < 20<br>Group by R.x | And 15 < R.a < 50 | And 10 < R.a < 25<br>Group by S.y |
|---|---|---|
| $V_1 \oplus V_2 =$ | $V_1 \oplus V_3 =$ | |
| Select R.x, R.a, S.y, R.z<br>From R, S where<br>R.x = S.y<br>And 10 < R.a < 50 | Select R.x, S.y, R.a, sum(S.y),<br>sum(S.z)<br>From R, S where<br>R.x = S.y<br>And 10 < R.a < 25<br>Group by R.a, R.x, S.y | |

2.3 Indexes on Views

The description above has covered the merging operation applied to materialized views, without paying attention to indexes over those materialized views. In reality, each materialized view may typically be associated with a set of indexes, and those indexes are used during query processing. Previous work in the literature has considered index merging and view merging as separate operations. However, according to an example embodiment, both structures may be described in a unified manner. For this purpose, according to an example embodiment, all indexes may be considered as defined over some view (base tables are also trivial views, so this definition includes regular indexes as well), for example. Specifically, for a sequence of columns I and a view V that contains all I columns in its SELECT clause, we denote I|V as the index with columns I over the materialized view V, for example. For the special case I=Ø, we define Ø|V to be the unordered heap containing all the tuples (rows) in V (for simplicity, V and Ø|V may be used interchangeably).

Unified Merging Operator: We now define the merging of two arbitrary indexes over views. Consider the simplest case of merging two indexes defined over the same view. In this case: $(I_1|V) \oplus (I_2|V) = (I_1 \oplus I_2)|V$, where $I_1 \oplus I_2$ is the traditional index-merge operation. To address the general case, we need to first introduce the notion of index promotion. Consider an index (I|V) and suppose that $V_M = V \oplus V'$ for some view V'. Promoting I over V to $V_M$ (denoted $I \uparrow V_M$) results in an index over $V_M$ that can be used (with some compensating action) whenever (I|V) is used. According to an example embodiment, this promoted index may typically contain all columns in the original index followed by every column that was added to the select clause in $V_M$. For instance, consider:

$V_1$=SELECT x,y FROM R WHERE 10<a<20

$V_2$=SELECT y,z FROM R WHERE 15<a<30

$V_1 \oplus V_2$=SELECT a,x,y,z from R where 10<a<30

We have then that $[x] \uparrow (V_1 \oplus V_2) = [x,a]$. Using index promotion, the merging of two indexes on views may be defined as follows, for example:

$$(I_1|V_1) \oplus (I_2|V_2) = ((I_1 \oplus I_2) \uparrow (V_1 \oplus V_2))|(V_1 \oplus V_2)$$

That is, according to an example embodiment, the merged index $(I_1 \oplus I_2)$ is first obtained, followed by obtaining the view $(V_1 \oplus V_2)$, and finally, the merged index is promoted to the merged view.

3.0 Reduction Operations

Figure 5:
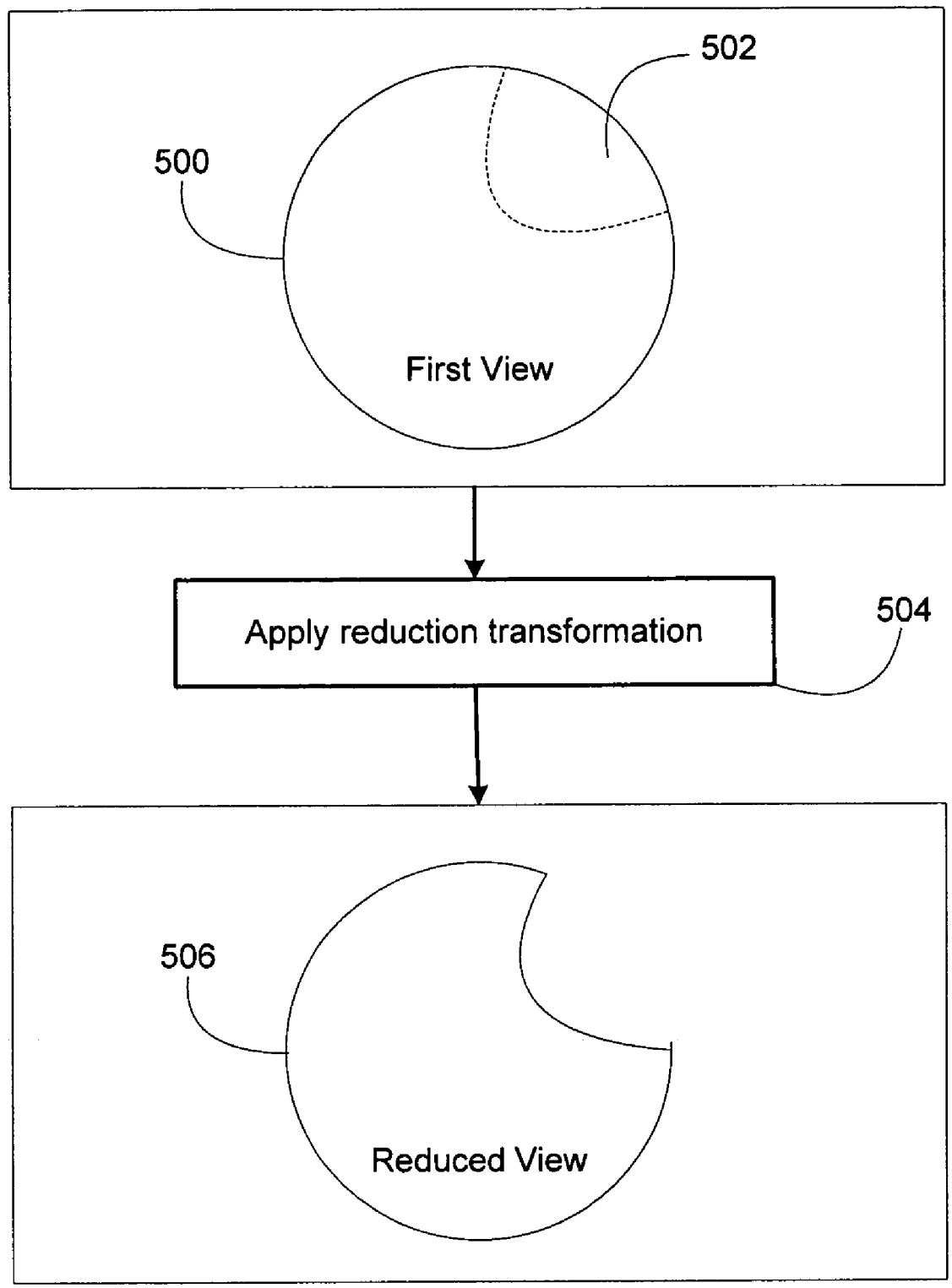
FIG. 5 is a block diagram illustrating a reduction process (or reduction transformation) according to an example embodiment.

FIG. 5 is a block diagram illustrating a reduction process (or reduction transformation) according to an example embodiment. The reduction process may be similar to or the same as (or analogous to) a subset operation in sets, for example. A first view 500 is provided including a portion 502.

In an example embodiment, portion 502 may be recreatable or reproducible based on a remaining portion of view 500. In an example embodiment, the deleted portion 502 may be recreated from the reduced view according to a set of rules (which may vary). Therefore, a reduction transformation is applied (504) to produce a reduced 506. A database configuration having a smaller size may be obtained in this manner, at the expense of processing efficiency (efficiency penalty), e.g., the additional processing that may be required to recreate or reproduce the portion 502 from the reduced view 506 (which may be referred to as a compensating action).

For example, with reference to FIG. 1, the first view 108 (including name, age, state and zip code) may be reduced by eliminating the state element (WA), since the state may be recreated or determined from the zip code (98004) (the remaining portion or the reduced view). This is because, according to the set of rules that may apply to this particular example, a state may be determined from a zip code, e.g., each zip code is associated with only one state. Thus, the state may be deleted (e.g., redundant information) and recreated based on the other information in the reduced view. This is merely an example and many other examples and rules may be used for a reduction process to decrease a size of the view. A compensating action (associated with the efficiency penalty) may be required to reproduce the first view 108, by determining the state associated with zip code=98004, for example.

Figure 6:
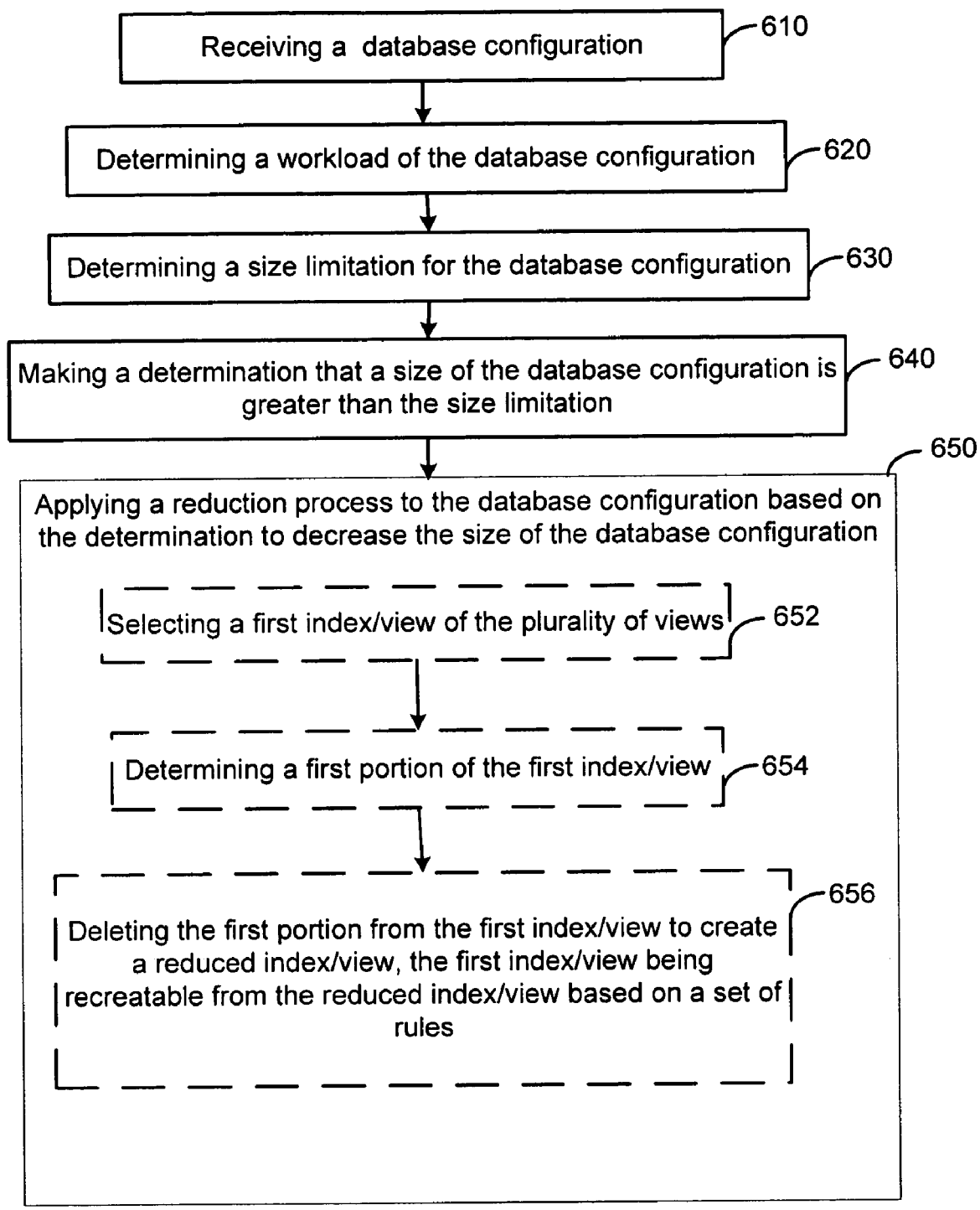
FIG. 6 is a flow chart illustrating a refinement of a database configuration using a reduction process according to an example embodiment.

FIG. 6 is a flow chart illustrating a refinement of a database configuration using a reduction process according to an example embodiment. At 610, a database configuration is received. At 620, a workload is determined for the database configuration. At 630, a size limitation for the database configuration is determined. At 640 a determination is made that a size of the database configuration is greater than a size limitation for the database.

At 650, a reduction process is applied to the database configuration based on the determination (e.g., if the size of the database configuration exceeds the size limit) to decrease the size of the database configuration. The applying a reduction process (650) may include, for example: selecting a first index/view of a plurality of views (652); determining a first portion of the first index/view (654); and deleting the first portion from the first index/view to create or produce a reduced index/view, the first index/view being recreatable or reproducible from the reduced index/view based on a set of rules.

Some additional details and examples will now be described for the reduction operation. In the previous section relating to merge operation, a mechanism was described, for example, to decrease the amount of redundancy between a pair of indexes over views. The idea, for example, may be to merge them into a new index that might be smaller than the combined inputs, but at the same time less efficient to answer queries. In this section we present a second operator that follows the same principle, but operates over a single input index.

Specifically, we may exploit the fact that associated to each index IV there is a supporting primary index or heap that contains all rows and columns of the view V, according to an example embodiment. According to an example embodiment, we use the variable name IV to denote an indexed view, that is an index defined over a view. Therefore, an index over a view can be transformed into another one that is smaller but requires a compensating action involving the corresponding supporting structures. Consider for instance an index I=[a,b,c] over a base table R. We can transform I into I'=[a,b] which is smaller and requires compensating actions to produce the results that I produces by itself (in this case, fetches to R's primary index or heap to retrieve the missing column c), for example. Thus, we can change the definition of an index over a view, possibly reducing its size, and then apply compensating actions to recreate the original structure. We call this operation reduction and denote it with the Greek symbol Rho ($\rho$). Conceptually, the reduction operation eliminates redundancy just like the merging operation, but it uses a single input structure.

As another way to describe the reduction operation $\rho$, the reduction operation takes an index IV (e.g., using the $L_{MV}$ as the language for views), a set of tables T', and a set of columns K' as inputs, and returns a new index $\rho$(IV, T', K'). For a view V=I|(S, T, J, R, Z, G), the operational semantics of $\rho$((I|V), T', K') are given in three steps as follows, according to an example embodiment.

1) If T'⊄T, the reduction may be ill-defined and thus, the process may be stopped. (The symbol ⊄ is the "not included" operator between sets. A⊄B if there is an element in A that is not in B]). Otherwise, a reduced version of V may be obtained that only references tables T', defined as V'=(S', T', J', R', Z', G'), where a. J'⊄J, R'⊄R, Z'⊄Z, where each base table column referenced in J', R', and Z' refer exclusively (in an example embodiment) to tables in T'.
   b. S' contains the subset of columns in S that belong to tables in T' plus all columns in T' referenced in J-J', R-R', and Z-Z'.
   c. If G≠Ø (where Ø is empty set), G' contains all the columns in G that belong to tables in T' plus all columns in S'-S. Otherwise, G'≠Ø.
   d. If V' contains Cartesian products we consider the reduction invalid, for example, and the process is typically stopped. (e.g., a Cartesian product does not typically provide any efficiency advantage and may be much larger than the input relations). (A Cartesian product between two sets may include all (e.g., consist of all) the pairs of all combinations of elements of the input sets. For instance, Cartesian_product({a,b,c}, {1,2})={(a,1), (a,2),(b,1),(b,2),(c,1),(c,2)}).

2) We obtain I' from I by first removing all columns that do not belong to tables in T', and then adding all columns in S'. (this step is similar to I↑V')

3) If K⊄I', the reduction may be considered ill-defined and we stop. Otherwise, we define $\rho$((I|V), T', K')=K'|V'.

Merging and reduction are powerful primitive operations that may be used to decrease the amount of redundancy in a set of indexes.

4.0 Further Examples and Details on PDR

4.1 PDR Problem Statement

The physical design refinement (PDR) problem may be described, for example, as follows. Consider a physical database configuration C={$I_1|V_1, \ldots, I_n|V_n$} that includes several indexes (I) on views (V) (also recall that base-table indexes may be defined over trivial views). In an example, database configuration C may have been obtained by tuning the database system for a typical workload by either a skilled DBA (database administrator) or an automated tool, for example. The size of a database configuration C may be the combined size of all indexes in C plus the size of heaps (or other data) for indexes on views that do not have a primary index in C, for example. In an example embodiment, a primary index or heap may be provided for each view).

Now, in an example embodiment, after some time the database grows such that the size of the database configuration C (size(C)) becomes larger than the allocated space. It is desirable to obtain a configuration that fits in the storage constraint without compromising the quality of the original configuration C. Instead of considering every possible index for the new configuration, according to an example embodiment, our search may be restricted to those that are either in the initial configuration or can be derived from it via a series of merging and reduction operations. The rationale is that every original execution plan can be in principle adapted with local compensating actions so that it uses the views in the new configuration (or, alternatively, the query can be re-optimized and obtain the new optimal plan).

Workload inference: During refinement, it may be desirable to measure the quality of each candidate configuration that is considered. In an example embodiment, the current configuration may have resulted from a tuning session either by a DBA or an automated tool, for example. It is then expected that many or even all indexes over views in the current configuration may be somehow useful in answering queries in the actual workload, for example.

According to an example embodiment, a hypothetical workload may be inferred with queries that mimic the functionality of each index present in the current configuration. It may be assumed that if a new configuration can efficiently process such hypothetical workload, the benefits of the original indexes would be preserved. Specifically, in an example embodiment, each index IV=I|(S, T, R, J, Z, G) may be associated with a set of queries, called queries(IV), which stress every kind (or at least different kinds) of index usage.

| Scan | Ordered Scan | Seek |
|---|---|---|
| Select I from T where R and J and Z Group by G | Select I From T where R and J and Z group by G order by I | Select I From T where R and J and Z [and σ (prefix I)] group by G [Having σ (prefix I)] |

In absence of additional information, a predefined weight may be assigned to each query (to balance different index usages). However, if the execution of queries is tracked in the system, an accurate measurement of the relative importance of each index usage may be obtained, along with use those relative weights in the refinement process. To define the physical design refinement problem, we first introduce the closure of a configuration under the merging and reduction operations:

Definition 2: Let C be a configuration and let $C_i$ (I≧0) be defined as follows:

$C_0=C$ $C_{i+1}=C_i \cup \{IV_1 \oplus IV_2$ for each compatible $IV_1, IV_2 \epsilon C_i\}$ $\cup \{\rho(IV,T,K)$ for each $IV \epsilon C_i$ and valid choices of T and K$\}$.

where U is the union operator, and $\epsilon$ means "belongs to" and Returns true if an element is a member of a set.

Also, Closure $C=C_k$, where k is the smallest integer that satisfies $C_k=C_{k+1}$.

The operator ⊕ (merge) may refer to merge operation (or merge process), while the operator $\rho$ may refer to reduction operation (or reduction process), according to an example embodiment.

Definition 3 (PDR): Given a configuration C={$I_1|V_1, \ldots, I_n|V_n$} and a storage constraint B, obtain the refined configuration C' such that:

$$C' \subseteq closure(C)$$

$$Size(C') \leq B$$

$\Sigma_{(I|V) \in C} \Sigma_{qi \in queries \in (I|V)}(w_i \cdot cost(q_i, C'))$ is minimized where $w_i$ is the weight associated with query $q_i$, and cost (q, C) is the optimizer estimated cost of query $q_i$ under configuration C. In other words, the sum of the weighted costs for the indexes over views is minimized for the new configuration C'.

Some additional properties which may exist:
  the optimal or best solution may be a subset of the closure of the input set of indexes.
  The weight (size) of an index may not be constant, but may depend on the context, e.g., to account for a primary index or heap associated with each different view definition. If many indexes share their view definition, for example, there may be a single primary index or heap for that group of indexes.
  The benefit of each index (cost) may also be context dependent. e.g., an index not used to answer a query may become useful in conjunction with another index.

4.2 Pruning the Search Space

Some properties will now be described that may be useful in defining heuristics for traversing the search space and approximating PDR. There are two properties described below relating to the merge operator, according to an example embodiment.

Property 1: For a configuration C, $IV_1$ and $IV_2$ be indexes in a closure C, and $IV_M = IV_1 \oplus IV_2$. If $IV_M$ (merged view) cannot be obtained by merging and reducing views in closure C unless $IV_1$ is in the derivation, the optimal PDR configuration cannot include both $IV_1$ and $IV_M$ (analogously $IV_2$ and $IV_M$). Property 1 shows that if we merge two indexes $V_1$ and $V_2$, in some scenarios the optimal solution cannot contain both the merged view and any of the inputs. As shown below, sometimes certain indexes cannot be part of the optimal solution.

Property 2: Let C be a configuration, and let $IV_1$ and $IV_2$ be indexes in a closure C, and if $IV_M = IV_1 \oplus IV_2$ belongs to the optimal PDR solution, then either:
  i) $size(IV_M) < size(IV_1) \oplus size(IV_2)$, or
  ii) there are {$IV_3, \ldots IV_n$} $\subseteq$ closure C such that $IV_m = IV_m \oplus IV_3 \oplus \ldots \oplus IV_n$ and $size(IV_m) < \Sigma_i$ size $(IV_i)$ The symbol $\subseteq$ is the inclusion-or-equal operator between sets. It returns true if a set is completely included in (or is equal to) another.

There are analogous properties for reduction operator.

4.3 Heuristic Approach to Approximate PDR

In this section an example heuristic approach is described to solve PDR that is derived from the greedy solution to the fractional knapsack problem, according to an example embodiment. In the fractional knapsack problem, the input objects $o_i$ are first sorted in ascending order by the value-volume ratio $v(o_i)/W(o_i)$ and then remove objects from this sequence until either the remaining objects fill completely the capacity B, or the last removed object $o_k$ is the one that exceeds B. In the latter case, we add back a fraction of $o_k$ so that the total volume is exactly B. (Alternatively, the objects may be sorted objects in reverse order and keep a prefix of the sequence. This is equivalent to the solution described above, which leads more easily to our adaptation.}. This assignment may be considered optimal if fractions of objects are allowed in the answer. Even in the 0/1 case (i.e., no fractional objects are allowed), this heuristic performs very well in many practical cases and a very simple refinement guarantees a factor-2 approximation to the optimal solution. A straightforward adaptation of the greedy solution described above would first generate the closure of the input configuration C, and then iteratively remove from the current configuration the index with the smallest value-volume ratio until the remaining ones satisfy the storage constraint. This approach may have the following problems:

The size of closure C can be in the worst case exponential in the number of original indexes. At the same time, intuitively the best views may typically be either the original ones, or obtained via a short sequence of operations (recall that each operation degrades the performance of the workload). Most of the indexes in closure C are not present in the optimal configuration.
  The size of an index is not constant but depends on the configuration it belongs to. The reason is that we need to account for a primary index or heap associated with each different view definition. If many indexes share their view definition, we consider a single primary index or heap for them.
  It may not be straightforward to assign benefits and weights to views in closure C due to complex interactions in the optimizer, for example.

Properties 1-4 described above may not necessarily be exploited for pruning the search space, in an example embodiment.

To address these issues, a progressive variation of the fractional knapsack solution is described below. Pseudocode for an example embodiment of the progressive variation of the fractional knapsack is illustrated in FIG. 8. The example shown in FIG. 8 begins with the original configuration (line 1) and progressively refines it into new configurations that are smaller and slightly more expensive (lines 2-4). When a configuration is obtained that is within the storage constraint (or any other stopping criteria), it is returned at line 5. One class of transformations in line 3 is the same as in the greedy solution to the greedy or fractional knapsack problem (i.e., removing indexes). However, other transformations are (or may be) used, such as those transformations that augment search space on demand by replacing one or two indexes with either a merged or reduced index, for example. For example, other transformations explore the search space vertically: one or two indexes are removed from the current configuration and replace them with either a merged or reduced index, for example. Thus, the search space may be explored on demand, eliminating redundancy by merging or reducing views as the process proceeds.

We consider the following transformations in line 3: (i) deletion of each index in the current configuration CF, (ii) merging of each pair of compatible indexes in current configuration CF, and (iii) reductions of each index in current configuration CF. (CF is a variable name, e.g., representing the final configuration that is found by PDR). Specifically, for (iii) we consider reductions $\rho(IV, T, K)$ so that K are prefixes of the columns in the resulting index, and T are subsets of tables that match another view in CF.

Properties 2 and 4 may be exploited in line 3 (pseudocode of FIG. 8) by not considering transformations (merges and reductions) whose result is larger than the combined sizes of their inputs.

Properties 1 and 3 (line 4, FIG. 8) may be exploited by removing, possibly in most situations, the input indexes whenever the resulting index should be in the final solution (i.e., the benefit of the transformed index is larger than that of the original ones).

Rather than assigning a constant benefit and weight to ach index, a dynamic approach may be used that considers the interactions with the optimizer. For a given configuration C, a penalty of the transformation (e.g., deletion, merging, reduction) may be defined as Δcost/Δspace, where Δcost is an estimate of the degradation in cost that is expected if the transformation is applied, and Δspace is the amount of space that would likely be saved by applying the transformation. Penalty values are then a measure of units of time that are lost per unit of space that are gained for a given transformation.

To avoid incremental errors in estimation, after each transformation the inferred workload may be re-optimized under the new configuration CF. In an example embodiment, optimization calls may be decreased or minimized by only re-optimizing the queries in the workload that used an index that got removed from current configuration CF. The rationale is that we keep replacing indexes with coarser alternatives, so any query that did not use, for example, $IV_1$ in a given configuration, should not use the merge operation, $IV_1 \oplus IV_2$ or reduction operation, $\rho(IV_1, T, K)$ if they became additionally available. This heuristic saves significant time and typically does not substantially degrade the quality of the final configurations, in an example embodiment.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus comprising,
a processing device to automatically perform a series of iterative database configuration transformations to locally change a database configuration of a database, the processing device adapted to:
 make a determination that a first database configuration of the database has grown to a size that is greater than a size limitation for the first database configuration;
 automatically select and apply a first database configuration transformation from a plurality of database configuration transformations to the first database configuration in response to the determination to produce a refined database configuration having a smaller size than the first database configuration, wherein the first database configuration transformation is selected based on processing efficiency for a workload of the first database configuration;
 optimize the workload according to the refined database configuration after the first database configuration transformation is applied; and
 progressively select and apply one or more additional database configuration transformations to refined database configurations automatically until it is determined that a size of a current local database configuration of the database is not greater than the size limitation of the first database configuration, wherein each additional database configuration transformation is selected based on processing efficiency for an optimized workload that is re-optimized after each additional database configuration transformation is applied,
wherein the database configuration transformations include at least one of a merge process and a reduction process, the merge process comprising determining a first index/view and a second index/view and producing a merged index/view by identifying and eliminating one or more redundancies that may exist between the first index/view and the second index/view, the reduction process comprising determining a first index/view and deleting a first portion from the first index/view to create a reduced index/view that is recreatable from the reduced index/view based on a set of rules.

2. The apparatus of claim 1 wherein the first database configuration includes a set of indexes and views.

3. The apparatus of claim 1, wherein the database configuration transformations include a deletion process.

4. The apparatus of claim 1, wherein the processing device is adapted to:
  determine efficiency penalties for the plurality of transformations; and
  select the transformation having a lowest efficiency penalty.

5. The apparatus of claim 1, wherein the processing device is adapted to:
  determine efficiency penalties for the plurality of transformations;
  determine size reductions offered by the plurality of transformations; and
  select one or more of the transformations that, when applied, will decrease a size of the first database configuration while providing a lower efficiency penalty as compared to other non-selected transformations.

6. The apparatus of claim 1, wherein the processing device is adapted to:
  obtain the first database configuration of the database; and
  determine the workload of the first database configuration.

7. The apparatus of claim 6, wherein the processing device is adapted to:
  determine one or more common queries run on the first database configuration.

8. The apparatus of claim 6, wherein the first database configuration comprises a first database configuration with a plurality of views and a plurality of queries that may be run against the first database configuration, each view resulting from one of the queries, further wherein the processing device is adapted to:
  assign a query a predefined weight; and
  assign a view a predefined weight.

9. A computer-implemented method comprising:
  determining a size limitation for a database configuration of a database;
  determining a workload of the database configuration;
  making a determination by a processing device that the size of the database configuration of the database is greater than the size limitation; and
  automatically selecting and applying a series of iterative database configuration processes by the processing device in response the determination to locally change the database configuration of the database, wherein applying the database configuration processes comprises progressively applying a merge process to the database configuration automatically based on the determination to decrease a size of the database configuration until it is determined that a size of a current local database configuration of the database is not greater than the size limitation, the merge process comprising determining a first index/view and a second index/view and producing a merged index/view by identifying and eliminating one or more redundancies that may exist between the first index/view and the second index/view, wherein:
    a first database configuration process in the series is selected based on processing efficiency for the workload,
    the workload is optimized according to a refined database configuration after the first database configuration process in the series is applied, and
    each additional database configuration process in the series is selected based on processing efficiency for an optimized workload that is re-optimized after each additional database configuration process in the series is applied.

10. The method of claim 9, wherein the database configuration comprises a plurality of views and a plurality of queries that may be run against the database configuration that may or may not be associated with a view, each view resulting from one of the queries, wherein the determining a workload comprises:
  tracking the execution of the plurality of queries;
  determining a weight for one or more of the queries based on the tracking; and
  determining a weight for one or more of the views based on the tracking.

11. The method of claim 9, wherein the applying a merge process comprises:
  determining a third index/view; and
  merging the first index/view, the second index/view, and the third index/view.

12. The method of claim 9, wherein
  the first index/view and the second index/view each comprise one or more selected columns of a base table.

13. The method of claim 12, and further comprising:
  receiving a query associated with the first index/view; and
  removing information from the merged index/view that is associated only with the second index/view to generate the requested first index/view.

14. The method of claim 9, wherein the method further comprises:
  optimizing queries in the workload that used an index that was removed after a merge.

15. A computer-implemented method comprising:
  receiving a database configuration of a database;
  determining a workload of the database configuration;
  determining a size limitation for the database configuration;
  making a determination by a processing device that the size of the database configuration of the database is greater than the size limitation; and
  automatically selecting and applying a series of iterative database configuration processes by the processing device in response the determination to locally change the database configuration of the database, wherein applying the database configuration processes comprises progressively applying a reduction process to the database configuration automatically to decrease the size of the database configuration until it is determined that a size of a current local database configuration of the database is not greater than the size limitation, the reduction process comprising determining a first index/view and deleting a first portion from the first index/view to create a reduced index/view that is recreatable from the reduced index/view based on a set of rules, wherein:
    a first database configuration process in the series is selected based on processing efficiency for the workload, the workload is optimized according to a refined database configuration after the first database configuration process in the series is applied, and each additional database configuration process in the series is selected based on processing efficiency for an optimized workload that is re-optimized after each additional database configuration process in the series is applied.

16. The method of claim 15, wherein the database configuration comprises a plurality of views associated with the database configuration and a plurality of queries that may be run against the database configuration, each said view resulting from one of the queries, wherein the determining a workload comprises:

tracking the execution of one or more of the plurality of queries;

determining a weight to assign one or more of the queries based on the tracking; and determining a weight to assign one or more of the views based on the tracking.

17. The method of claim 15, wherein the database configuration comprises a plurality of views associated with the database configuration and a plurality of queries that may be run against the database configuration, each said view resulting from one of the queries, and the reduction process is applied to a view selected from the plurality of views to create a reduced view.

18. The method of claim 15, wherein the set of rules includes a compensating action to recreate the first index/view.

19. The method of claim 15, wherein the method further comprises:

receiving a query associated with the reduced index/view; and recreating the first index/view from the reduced index/view based on the set of rules.

20. The method of claim 15, wherein the method further comprises:

optimizing queries in the workload that used an index that was removed after a reduction.

* * * * *

UNITED STATES PATENT AND TRADEMARK OFFICE
CERTIFICATE OF CORRECTION

| | | |
|---|---|---|
| PATENT NO. | : 7,685,145 B2 | Page 1 of 1 |
| APPLICATION NO. | : 11/391649 | |
| DATED | : March 23, 2010 | |
| INVENTOR(S) | : Nicolas Bruno et al. | |

It is certified that error appears in the above-identified patent and that said Letters Patent is hereby corrected as shown below:

In column 7, line 67, after "above.) The" insert -- reason --.

In column 12, line 6, after "reduced" insert -- view --.

Signed and Sealed this
First Day of February, 2011

David J. Kappos
*Director of the United States Patent and Trademark Office*